United States Patent Office 3,790,659
Patented Feb. 5, 1974

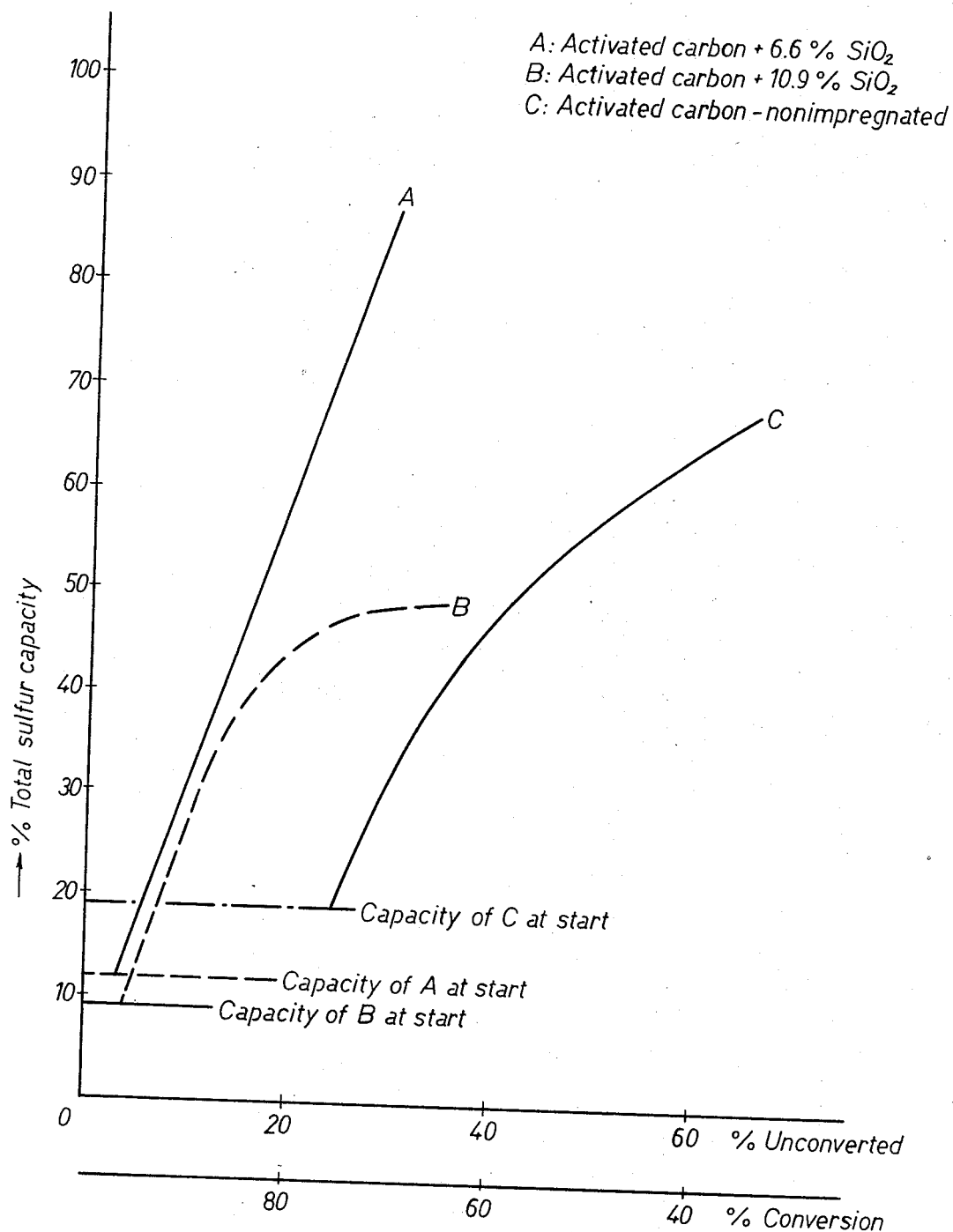

---

3,790,659
ACTIVATED CARBON CATALYST IMPREGNATED WITH SiO$_2$
Klaus Storp, Frankfurt am Main, and Reinhard Höhne, Neu Isenburg, Germany, assignors to Metallgesellschaft Aktiengesellschaft, Frankfurt am Main, Germany
Filed Apr. 20, 1971, Ser. No. 135,633
Int. Cl. B01d 53/16, 53/34
U.S. Cl. 423—224
2 Claims

ABSTRACT OF THE DISCLOSURE

Activated carbon catalyst, impregnated with silicate, for promoting the sulfur-forming reactions:

$$2H_2S + SO_2 \rightarrow 3S + 2H_2O$$

$$H_2S + \tfrac{1}{2}O_2 \rightarrow S + H_2O$$

The SiO$_2$ concentration is 0.5 to 8.0% by weight, preferably 3.0 to 7.5% by weight, the internal surface is 1200 to 1500 m.$^2$/g., the bulk density is at most 350 g./liter and the modal pore radius is 4 to 12 A.

(1) FIELD OF THE INVENTION

Our present invention relates to a catalyst system for sulfur-producing reactions and, more particularly, to an improved activated-carbon catalyst for converting hydrogen sulfide and sulfur dioxide to elemental sulfur and water and/or for the conversion of hydrogen sulfide to elemental sulfur and water by reaction with oxygen; the invention also relates to a method of making the catalyst system, to the method of using the catalyst system, and to a process for reacting hydrogen sulfide with sulfur dioxide and/or oxygen to produce elemental sulfur.

(2) BACKGROUND OF THE INVENTION

Activated carbon catalysts have been used heretofore in the purification of exhaust gases, waste and contaminated air, and other gas streams which contain hydrogen sulfide alone or in combination with sulfur dioxide. Such gases may include the waste gases of a Claus process, gases arising from the thermal treatment of metallurgical materials, e.g. roasting, and gases generated in petrochemical operations. Typical hydrogen sulfide gases, which may also contain sulfur dioxide, are the Claus-process gases, mentioned earlier and expanded gases obtained in gas-washing or scrubbing operations. For example, waste gases of petrochemical processes are often flashed or burned with atmospheric air and, since these gases contain sulfur compounds, there frequently results a mixture of hydrogen sulfide and sulfur dioxide.

In order to prevent the venting of noxious sulfur-containing gases to the atmosphere and to recover valuable constituents of these gases, it is not uncommon to provide an adsorption stage in which activated carbon constitutes the adsorption mass as well as a catalyst for reaction of the bound-sulfur components. It thus is known to use activated carbon as a catalyst for the reaction of sulfur dioxide with hydrogen sulfide or for the reaction of hydrogen sulfide with oxygen, to produce elemental sulfur and water. The reactions may be denoted as follows:

$$2H_2S + SO_2 \rightarrow 3S + 2H_2O$$

$$H_2S + \tfrac{1}{2}O_2 \rightarrow S + H_2O$$

The adsorption and regeneration step, resulting in sulfur recovery, was generally effected with a hot inert gas, e.g. steam or nitrogen, although solvent extraction techniques have also been used. With prior-art catalyst systems, however, the repetition of adsorption-desorption cycles results in a buildup of sulfur which cannot be eliminated by the desorption practices (generally the sulfur content levels off at about 20% of the total adsorptive capacity of the activated carbon). This residual sulfur cannot be removed to any significant extent with hot inert gases of the type used for desorption, or even with solvent extraction using alkaline solutions or carbon disulfide. This residual sulfur, which cannot be desorbed, reduces the net adsorption capacity which we define as the difference between the total adsorption capacity and the residual sulfur. Consequently, if it is assumed that the activated carbon mass has an original or initial capacity of A and residual sulfur, which cannot be desorbed, builds up to a level of 20% A, the net adsorption capacity can be represented by $B = 80\%$ A. Effectively, therefore, a larger volume of the activated carbon is required to process a given quantity of gas, the reaction economy is reduced, and the sulfur yield per unit volume is likewise diminished. Of even greater significance, however, is the fact that the residual sulfur reduces the degree of conversion of the hydrogen sulfide and/or sulfur dioxide to elemental sulfur, i.e. reduces the degree to which the hydrogen sulfide-sulfur dioxide and hydrogen sulfide/oxygen reactions proceed to completion. In general, therefore, the economy of the desulfurizing process is reduced.

(3) OBJECTS OF THE INVENTION

It is the principal object of the present invention to provide an improved catalyst system adapted to overcome the aforementioned disadvantages and enable the adsorption of sulfur-containing compounds from a gas stream and the reaction of hydrogen sulfide with sulfur dioxide or with oxygen to yield elemental sulfur, in an efficient and economical manner.

It is another object of this invention to provide an improved catalyst for the purposes described which is characterized by lower residual sulfur content, even after a number of adsorption-desorption cycles, and which permits higher degrees of conversion to be obtained while allowing substantially complete and economical desulfurization of gases treated with the activated carbon.

It is a further object of the invention to provide an efficient and economical method of making the improved catalyst. It is also an object of the invention to provide an improved process for removing sulfur-containing gases from a gas stream, especially the waste gases of a Claus reaction.

(4) SUMMARY OF THE INVENTION

We have discovered, quite surprisingly, that these advantages can be obtained, and the aforedescribed drawbacks obviated, with a catalyst system which includes a silicate distributed in the activated carbon in an amount of 0.5 to 8.0% by weight, in terms of SiO$_2$ and preferably 3.0 to 7.5% by weight SiO$_2$.

While we do not fully understand the reason for the improved results obtained with the present catalysts, it has been observed that the additive appears to limit the tendency of the activated carbon to lock in elemental sulfur or other residues and thereby reduce the adsorption capacity of the mass. The silicate component may vary the thermal characteristics of the activated carbon or may modify some physical properties of its reactive surface, since the resultant improvement of the activated carbon catalyst is unexpected from the manner in which SiO$_2$ adsorbents interact with sulfur-containing gases.

According to an important feature of this invention, the activated carbon, containing the SiO$_2$ component has an internal surface area of 1200 to 1500 m.$^2$/g. and a mean pore radius of 4 to 12 A. The bulk density of the adsorbent is at most 350 g./liter, although a bulk density ranging up to 280 to 350 g./liter is satisfactory.

According to another feature of this invention, the adsorbent catalyst is produced by impregnating activated carbon with a solution of an alkali-metal silicate, preferably sodium or potassium silicate, to yield a concentration of 0.5 to 8% by weight, preferably 3.0 to 7.5% by weight $SiO_2$. While the activated carbon catalyst, after drying at a temperature of, for example, 100° C. requires no further activation treatment to obtain the effect of the silicate, it has been found to be advantageous to use the catalytic adsorbent at a temperature between 120° C. and 160° C., regeneration being carried out with a flowing inert gas, e.g. nitrogen, at a temperature of 380° C. to 550° C. and for a period sufficient to reduce the sulfur content to a residual level of about 10 to 12%.

(5) DESCRIPTION OF THE DRAWING

The invention is described in greater detail below with reference to the accompanying drawing and specific examples, the sole figure of the drawing being a graph in which the total sulfur capacity is plotted along the ordinate while the conversion is plotted along the abscissa.

(6) SPECIFIC DESCRIPTION AND EXAMPLES

Activated carbon as described in commonly assigned application (now abandoned) Ser. No. 81,868 filed Oct. 19, 1970 (see also commonly assigned Pat. No. 3,634,-028) is impregnated with sodium silicate to yield an $SiO_2$ concentration of 3.0% by weight, 6.6% by weight and 10.9% by weight in three batches identified as catalysts 1, 2 and 3, respectively. These catalyst-adsorbents, having a mean pore radius of 4 to 12 A., a bulk density of 280 g./liter and an internal surface area of 1250 to 1450 m.$^2$/g., were compared with a control 4 containing no $SiO_2$ but otherwise consisting of activated carbon identical to that used for the catalysts 1, 2, 3. The catalysts each were employed to adsorb the sulfur compound from a Claus-reaction exhaust gas at a temperature of 140° C. and were regenerated by passing nitrogen or steam through the catalyst bed at a temperature of 420° C. until the residual sulfur content reached 10 to 12% or could be reduced further (steady state); the apparatus described in said application was used. Table 1 represents the results obtained after ten adsorption-desorption cycles from which it is apparent that the residual adsorbate on the activated carbon is a function of the concentration of the impregnated material. The tests also indicate that, for catalysts 1 to 3, the adsorption temperature may be varied between 120° C. and 160° C. with little change in effectiveness, and that the desorption temperature may be as low as 380° C. and as high as 550° C. In substantially all cases, a significant reduction in the residual adsorbed sulfur content was obtained so that the net adsorptive capacity was increased by at least 50% over that of the control at the end of the ten cycles. The net adsorption capacity can be more than tripled under some conditions. Hence, while it is to be expected that impregnating the activated carbon mass with a substance such as the silicate would reduce the net adsorption capacity, such impregnation increases markedly the net adsorption capacity, the degree of conversion and the economy of the system.

TABLE 1

| | Catalyst | | | |
|---|---|---|---|---|
| | 1 | 2 | 3 | 4 |
| Impregnating material | $SiO_2$ | $SiO_2$ | $SiO_2$ | |
| Concentration, percent | 3.0 | 6.6 | 10.9 | 0 |
| Amount of adsorbed sulfur at beginning of test, percent | 17.0 | 12.0 | 8.5 | 20.4 |
| Total sulfur adsorption capacity, percent | 53.3 | 85.5 | 49.0 | 43.4 |
| Net sulfur adsorption capacity, percent | 36.3 | 73.5 | 40.5 | 23.0 |
| Mean degree of conversion, percent | 76 | 83 | 75 | 48 |

An impregnated activated carbon is produced as described above with a concentration of about 7% by weight $SiO_2$ and compared with nonimpregnated activated carbon. A series of three adsorption-desorption tests were carried out with the results shown in Table 2 after ten cycles.

TABLE 2

| | Non-impregnated activated carbon | | | Impregnated activated carbon | | |
|---|---|---|---|---|---|---|
| Test | 1 | 2 | 3 | 1 | 2 | 3 |
| Residual amount of adsorbed sulfur, percent | 19.4 | 20.6 | 17.0 | 11.2 | 12.0 | 11.4 |

In the drawing, we show the improved conversion obtained with impregnated ($SiO_2$-containing) activated carbon (curves A and B) and with the activated carbon without impregnation. Curve A represents an activated carbon containing 6.6% $SiO_2$ while curve B represents an activated carbon containing 10.9% by weight $SiO_2$. Here, too, it is evident that high conversions at high adsorptivities are obtained with the impregnated material in contrast with the nonimpregnated material.

We claim:

1. A process for removing hydrogen sulfide from a gas stream, comprising reacting hydrogen sulfide with sulfur dioxide and/or oxygen on an activated carbon catalyst containing 0.5 to 8% by weight $SiO_2$ at a temperature of 120° C. to 160° C. to produce elemental sulfur and adsorb the same on said catalyst, said catalyst having an internal surface area of 1200 to 1500 m.$^2$/g. and a mean pore radius of 4 A. to 12 A.; and desorbing sulfur from said catalyst by passing an inert gas therethrough at a temperature of 380° C. to 550° C., sulfur being desorbed from said catalyst until the residual sulfur content thereof is between 10 and 12% by weight.

2. The process defined in claim 1 wherein said catalyst is prepared by impregnating an activated carbon mass with an alkali metal silicate, the silicon dioxide content being 3.0 to 7.5% by weight.

References Cited

UNITED STATES PATENTS

| 3,634,028 | 1/1972 | Hohne | 423—222 |
| 1,917,688 | 7/1933 | Baum | 423—575 |
| 1,917,689 | 7/1933 | Baum | 423—576 |
| 2,347,955 | 5/1944 | Korpi | 252—446 X |

EARL C. THOMAS, Primary Examiner

U.S. Cl. X.R.

423—230, 573, 576